United States Patent
Watanabe et al.

(10) Patent No.: US 7,825,828 B2
(45) Date of Patent: Nov. 2, 2010

(54) PARKING ASSIST DEVICE

(75) Inventors: Kazuya Watanabe, Anjo (JP); Kosuke Sato, Anjo (JP); Hiroshi Yamauchi, Anjo (JP)

(73) Assignees: Aisin Seiki Kabushiki Kaisha, Aichi (JP); Toyota Jidosha Kabushiki Kaisha, Aichi (JP)

( * ) Notice: Subject to any disclaimer, the term of this patent is extended or adjusted under 35 U.S.C. 154(b) by 261 days.

(21) Appl. No.: 12/093,792

(22) PCT Filed: Nov. 16, 2006

(86) PCT No.: PCT/JP2006/322835

§ 371 (c)(1),
(2), (4) Date: May 15, 2008

(87) PCT Pub. No.: WO2007/058246

PCT Pub. Date: May 24, 2007

(65) Prior Publication Data

US 2009/0091475 A1     Apr. 9, 2009

(30) Foreign Application Priority Data

Nov. 16, 2005   (JP)   ............... 2005-331565

(51) Int. Cl.
*G08G 1/14*   (2006.01)
(52) U.S. Cl. .............. 340/932.2; 340/435; 340/436; 340/437; 701/44; 701/41; 701/70
(58) Field of Classification Search .............. 340/932.2, 340/435, 436, 437, 901, 903; 701/41, 44, 701/301, 28, 26, 300
See application file for complete search history.

(56) References Cited

U.S. PATENT DOCUMENTS

| | | | |
|---|---|---|---|
| 5,742,141 A * | 4/1998 | Czekaj | 318/587 |
| 6,170,591 B1 * | 1/2001 | Sakai et al. | 180/204 |
| 6,476,730 B2 | 11/2002 | Kakinami et al. | |
| 6,483,442 B2 * | 11/2002 | Shimizu et al. | 340/932.2 |
| 6,611,744 B1 | 8/2003 | Shimazaki et al. | |

(Continued)

FOREIGN PATENT DOCUMENTS

CN     1690657 A     11/2005

(Continued)

OTHER PUBLICATIONS

Chinese Office Action dated Mar. 12, 2010 (with translation) (8 pages).

*Primary Examiner*—Davetta W Goins
*Assistant Examiner*—Hoi C Lau
(74) *Attorney, Agent, or Firm*—Sughrue Mion, PLLC

(57) ABSTRACT

A parking assist device includes a monitor (10) for displaying a captured image from a camera (12), assist information output means for providing assistance during introduction of a vehicle into a parking position, and correction control means (31) for correcting an inappropriate operation performed when the vehicle is introduced into the parking position. When a steering operation, an accelerator operation, or a brake operation is inappropriate, the correction control means (31) performs control to correct the travel course and the stop position. Thus, even if the driver performs an inappropriate operation when introducing the vehicle into the parking position, the driver can appropriately introduce the vehicle into the parking position according to the display on the monitor (10).

9 Claims, 11 Drawing Sheets

U.S. PATENT DOCUMENTS

| | | | |
|---|---|---|---|
| 6,621,421 B2 * | 9/2003 | Kuriya et al. | 340/932.2 |
| 6,657,555 B2 * | 12/2003 | Shimizu et al. | 340/932.2 |
| 6,950,035 B2 * | 9/2005 | Tanaka et al. | 340/932.2 |
| 7,043,346 B2 * | 5/2006 | Kubota et al. | 701/28 |
| 7,053,795 B2 | 5/2006 | Maemura et al. | |
| 7,069,128 B2 * | 6/2006 | Iwama | 701/36 |
| 7,229,139 B2 * | 6/2007 | Lu et al. | 303/140 |
| 7,366,595 B1 * | 4/2008 | Shimizu et al. | 701/301 |
| 7,375,651 B2 * | 5/2008 | Shimazaki et al. | 340/932.2 |
| 7,486,203 B2 * | 2/2009 | Tanaka et al. | 340/932.2 |
| 2002/0175832 A1 * | 11/2002 | Mizusawa et al. | 340/932.2 |
| 2003/0080877 A1 * | 5/2003 | Takagi et al. | 340/932.2 |
| 2003/0150661 A1 * | 8/2003 | Kataoka et al. | 180/204 |
| 2004/0153243 A1 * | 8/2004 | Shimazaki et al. | 701/300 |
| 2004/0257244 A1 * | 12/2004 | Kubota et al. | 340/932.2 |
| 2008/0158011 A1 * | 7/2008 | Yamanaka | 340/932.2 |

FOREIGN PATENT DOCUMENTS

| | | |
|---|---|---|
| DE | 103 38 255 A1 | 3/2004 |
| EP | 1 591 315 A1 | 11/2005 |
| JP | 11-105686 A | 4/1999 |
| JP | 2000-123297 A | 4/2000 |
| JP | 2000-335436 A | 12/2000 |
| JP | 2001-030936 A | 2/2001 |
| JP | 2001-055099 A | 2/2001 |
| JP | 2001-315600 A | 11/2001 |
| JP | 2003-011760 A | 1/2003 |
| JP | 2003-191809 A | 7/2003 |
| JP | 2003-276540 A | 10/2003 |
| JP | 2004-142659 A | 5/2004 |
| JP | 2004-148901 A | 5/2004 |
| JP | 2004-224178 A | 8/2004 |
| JP | 2004-352120 A | 12/2004 |
| JP | 2005-313775 A | 11/2005 |

\* cited by examiner

"please drive until the red line display enters the yellow frame"

"please turn the wheel all the way to the left and drive until the red line display enters the yellow frame"

"please set the shift lever in the reverse position"

"please turn the wheel all the way to the right and drive until the red line display enters the yellow frame"

"please return the wheel to the neutral position and drive until the red line display enters the yellow frame"

PARKING ASSIST DEVICE

TECHNICAL FIELD

The present invention relates to a parking assist device that is provided with a monitor for displaying a captured image from a camera provided to a vehicle, and assist information output means for displaying assist information during parking on the monitor.

BACKGROUND ART

Conventional technologies relating to a parking assist device having the kind of configuration described above includes one disclosed in Patent Document 1. In the device disclosed in Patent Document 1, when the shift lever is placed in the reverse position during parallel parking, steering initiation guide lines, vehicle width guide lines, and vehicle trajectory guide lines are superimposed on a camera image of the area to the rear of the vehicle and are displayed on a monitor. The vehicle is then driven in reverse, the vehicle is stopped when the steering initiation guide lines reach a target point, and the steering wheel is turned. A steering amount guide mark is moved by the turning of the steering wheel in this manner, and after the steering wheel is turned until the steering amount guide mark reaches the target point, the vehicle can be properly advanced into the parking space by driving the vehicle in reverse.

A technology relating to a parking assist device configured as described above is disclosed in Patent Document 2, which discloses performing a portion of the steering automatically to guide a vehicle into a parking position. In the technology disclosed in Patent Document 2, control is initiated with the vehicle body in a specific position with respect to a parking position, whereby the steering wheel is automatically turned by automatic steering control. As the driver moves the vehicle very slowly, the vehicle is moved into a traveling direction switching position. When the vehicle is in the traveling direction switching position, the front wheels are already steered appropriately for moving the vehicle into the parking position. The driver can then move the vehicle into the parking position by driving the vehicle in reverse.

[Patent Document 1] Japanese Laid-open Patent Application No. 2001-55099 (paragraph 0028, FIGS. 2, 3)

[Patent Document 2] Japanese Laid-open Patent Application No. 2000-335436 (paragraphs 0025 through 0027, FIGS. 1 through 3)

When the operations for introducing an automobile into a parking position are considered, the vehicle must be moved as precisely as possible along a path of introduction into the parking position. Reliable operation is desired particularly when parking is performed by a driver who is inexperienced in driving technique, or when the parking space is narrow. The aforementioned technologies disclosed in Patent Documents 1 and 2 are useful for such purposes.

However, even in a case in which the image from a camera is displayed on a monitor as described in Patent Document 1, the vehicle is stopped when the steering initiation guide line reaches the target point displayed on the monitor, and the steering wheel is turned, the vehicle sometimes cannot be properly introduced into the parking position when the vehicle is stopped in a position other than the optimal stopping position due to an incorrect stop timing. Similarly, the vehicle sometimes cannot be properly introduced into the parking position if the steering wheel is turned by an incorrect amount even when the vehicle is stopped in the correct stopping position. Particularly when the vehicle is introduced into a parking position on an inclined ground surface, the vehicle may move past the appropriate stopping position before stopping.

A technology such as the one disclosed in Patent Document 2, in which a portion of the operation for introducing the vehicle into the parking position is performed automatically, relieves the driver of the task of operating the vehicle. However, in the technology disclosed in Patent Document 2, the vehicle must be set in the correct position in an initial stage for initiating control.

From the perspective of the driver, the information necessary for parking must be acquired via the monitor the steering wheel must be properly operated, and the stopping position must be correct when the vehicle is introduced into the parking position as described in Patent Document 1. But, with the technology in which operations are automatically controlled, the vehicle must be set in the correct position in an initial stage, and this setting is difficult to perform.

An object of the present invention is to logically configure a device for correctly introducing a vehicle into a parking position even when driving operations for introducing the vehicle into the parking position are inadequate.

SUMMARY OF THE INVENTION

An aspect of the present invention resides in a parking assist device comprising a monitor for displaying captured images from a camera provided to a vehicle body, and assist information output means for displaying assist information for assisting parking on said monitor, wherein said camera captures a forward image, and said assist information output means performs routines for calculating a travel course for introducing the vehicle into a predetermined parking position, setting a target position on the travel course, displaying guide information corresponding to the target position over a ground surface displayed on said monitor during forward travel, and displaying an indicator corresponding to a current position of said vehicle on said monitor; and an auxiliary control means is provided for assisting a driving operation of a driver so as to guide said indicator to a position of said guide information when said vehicle is moved to a stopping position.

With this configuration, the vehicle can be moved along the travel course and introduced into the parking position by turning the steering wheel and moving the vehicle so as, for example, to superimpose the guide information displayed on the ground surface on the monitor, and the indicator displayed on the monitor. The auxiliary control means also corrects the driving operations when the steering wheel is operated incorrectly, the position of the guide information on the travel course is inaccurate, or other such conditions occur when the vehicle is moved along the travel course. As a result, the device is effectively configured to correctly introduce the vehicle into the parking position even when the driving operations for introducing the vehicle into the parking position are inaccurate.

In the present invention, said assist information output means may include travel course update means for calculating a positional error between said travel course and the vehicle based on a positional relationship between said guide information and the indicator, or a positional relationship between said target position and the vehicle, and newly calculating a travel course for introducing the vehicle from a current position to said parking position based on the positional error.

With this configuration, since the travel course is newly calculated based on a positional error calculated from the positional relationship between the guide information and the indicator, or the positional relationship between the target position and the vehicle, the error is not compounded through movement of the vehicle without resetting the travel course, and the vehicle can be correctly introduced into the parking position.

The present invention may further comprise a steering unit for steering a steered wheel of the vehicle based on operation of a steering wheel; and a steering sensor for measuring a steering angle of said steered wheel; wherein said auxiliary control means may control said steering unit and correct the steering angle of said steered wheel to a correct direction when a steering angle from the steering sensor differs from a target value that is set based on said travel course.

With this configuration, when the movement of the vehicle differs from the steering angle measured by the steering sensor, the steering unit is controlled and the steering angle of the steered wheels is adjusted to the correct direction, whereby an excess or deficiency of the steering angle can be corrected, and the vehicle can be moved in the correct travel course or a travel course that is close to the correct travel course.

The present invention may further comprise a brake unit for applying a braking force to a wheel of said vehicle based on a brake pedal operation; and a brake sensor for detecting operation of said brake pedal; wherein said auxiliary control means may perform braking control of said brake unit when said vehicle approaches a stopping position set in said travel course while said brake sensor detects that the brake pedal is being operated.

With this configuration, when the brake sensor detects that the driver is operating the brake pedal when the vehicle is near the stopping position, the auxiliary control means controls the braking of the brake unit, whereby the vehicle can be prevented from overrunning the stopping position.

The present invention may further comprise a speed setting unit for setting a travel speed of the vehicle based on operation of an accelerator operation member; and an accelerator sensor for measuring an amount of operation of said accelerator operation member; wherein said auxiliary control means may control said speed setting unit to reduce a travel speed of the vehicle to a value less than a travel speed set by said accelerator operation member when said vehicle approaches a stopping position set in said travel course.

With this configuration, the auxiliary control means controls the speed setting unit when the vehicle is near the stopping position, whereby the travel speed of the vehicle is reduced to a value less than the travel speed set by the accelerator operation member, and the vehicle can be prevented from overrunning the stopping position.

In the present invention, said guide information may be displayed on said monitor in a bar form, and said indicator may be displayed on said monitor as a rectangular frame in which said guide information is accommodated With this configuration, the vehicle can be moved along the travel course and introduced into the parking position by driving the vehicle so that the bar-form guide information is accommodated within the guide information composed of a rectangular frame.

In the present invention, said assist information output means may set a plurality of target positions located at intermediate positions within said travel course.

With this configuration, the vehicle can be introduced into the parking position by driving the vehicle along a plurality of target positions.

In the present invention, said assist information output means may set four target positions on said travel course and may set guide information for the four target positions when providing assistance during garage parking in which the vehicle is introduced into a parking position in an orientation orthogonal to the stopping orientation.

With this configuration, the vehicle can be moved by following the guide information that is set to four target positions.

In the present invention, said camera may comprise a front camera provided to a front end of said vehicle, and a rear camera provided to a rear end of said vehicle; and guide information that is set for a first and second of said four target positions may be displayed on a ground surface image captured by said front camera during forward travel of said vehicle; and guide information that is set for a third and fourth of said four target positions may be displayed on a ground surface image captured by said rear camera during reverse travel of said vehicle.

With this configuration, the vehicle can be moved by following the guide information of the first and second target positions displayed on the ground surface image captured by the front camera when the vehicle is moved forward, and the vehicle can be moved by following the guide information of the third and fourth target positions displayed on the ground surface image captured by the rear camera when the vehicle is moved in reverse.

In the present invention, said guide information and said indicator may be displayed in different colors on said monitor.

The guide information and the indicator can thereby be distinguished by display color on the monitor.

DETAILED DESCRIPTION OF PREFERRED EMBODIMENTS

Figure 1:
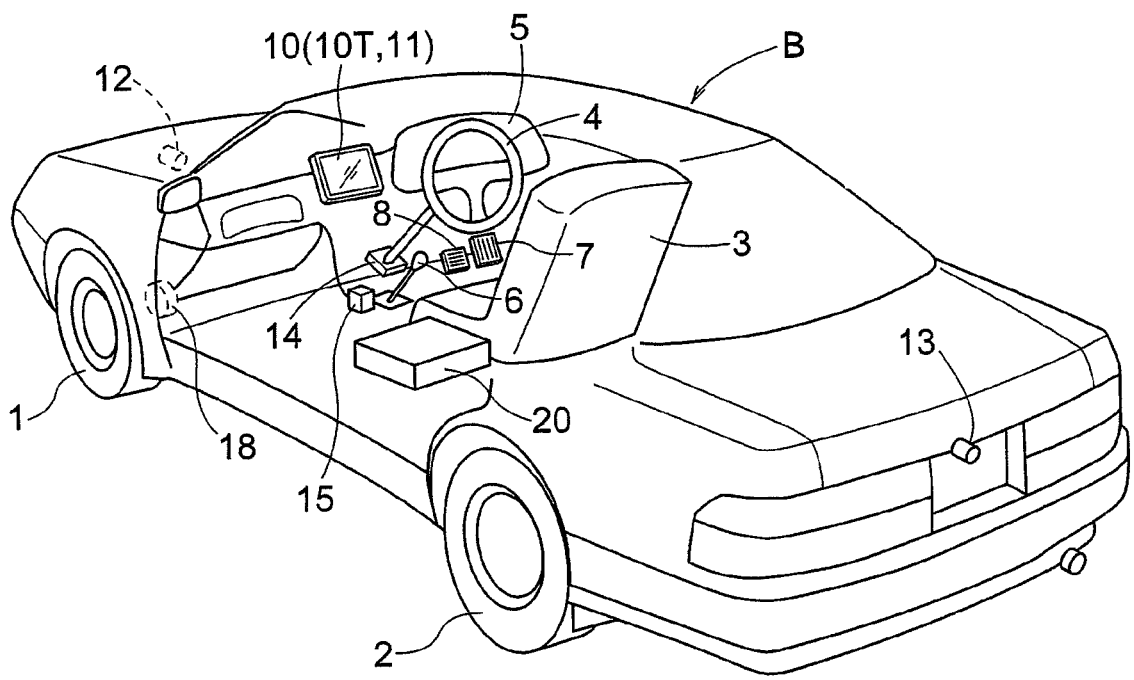
FIG. 1 is a perspective view in which a portion of an automobile is cut away.
Figure 2:
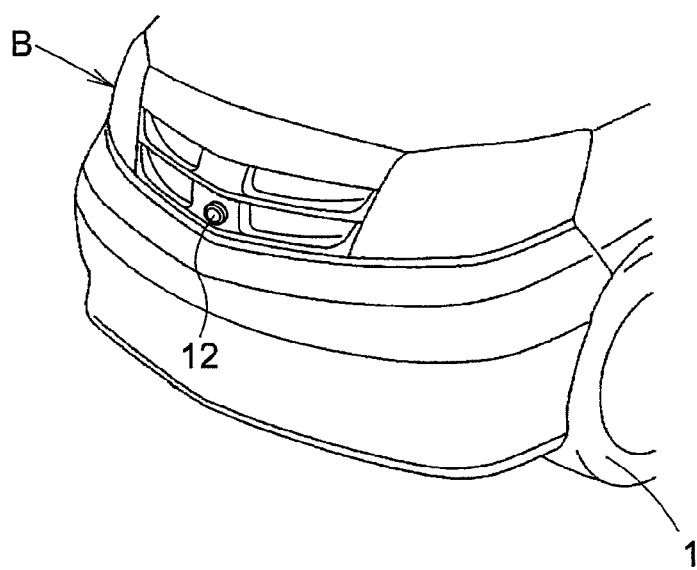
FIG. 2 is a perspective view showing the vehicle front.
Figure 3:
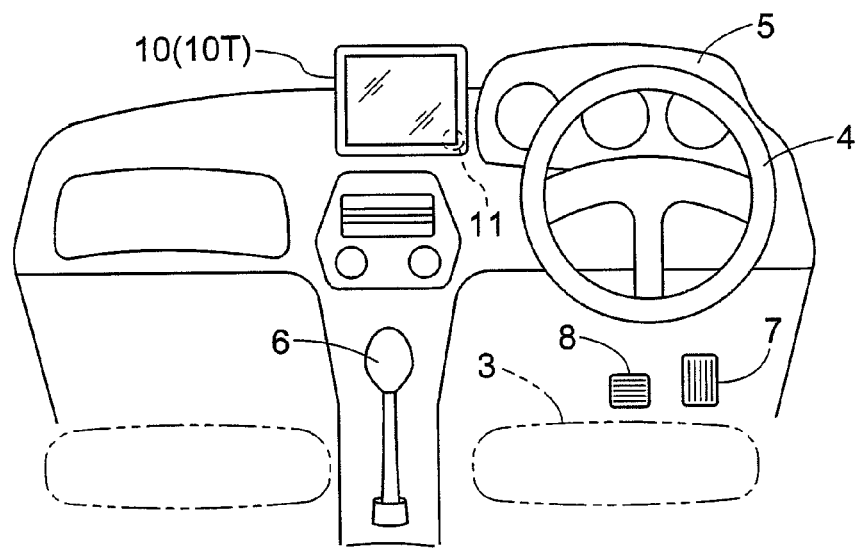
FIG. 3 is a diagram showing the region forwardly of the driver seat.
Figure 4:
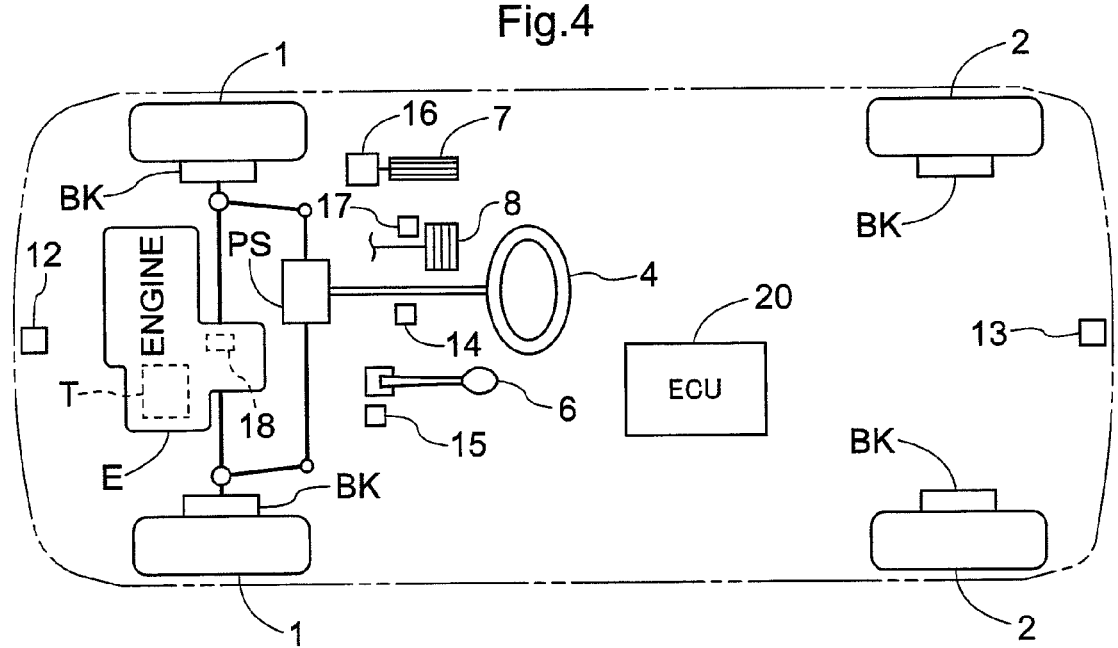
FIG. 4 is a plan view diagrammatically showing the structure of the vehicle.

Embodiments of the present invention will be described next with reference to the drawings.

(Overall structure) As shown in FIGS. 1 through 4, an automobile has a driver seat 3 and a steering wheel 4 are provided inside the cabin of a vehicle B that has front wheels 1 (an example of steered wheels) and rear wheels 2. A panel 5 having gauges is disposed at the front of the cabin, and a shift lever 6 for effecting a speed change is disposed beside the driver seat 3.

The steering wheel 4 is coupled to a power steering unit PS that performs a powered steering to transmit a rotational operating force to the front wheels 1. An engine E and a change speed (or transmission) mechanism T (an example of the speed setting unit) composed of a torque converter, a CVT, or the like for transmitting the drive force from the engine E to the front wheels 1, after changing the speed of the drive force, are disposed at the front of the vehicle. An accelerator pedal 7 as an accelerator operation member for controlling the travel speed, and a brake pedal 8 for operating a brake device BK of the front wheels 1 and rear wheels 2, and applying braking force to the front wheels 1 and rear wheels 2, are disposed next to each other in the vicinity of the driver seat 3.

A monitor 10 is provided in which a touch panel 10T is formed on the display surface in an upper position of a console near the driver seat 3, and a speaker 11 is provided to the casing for the monitor 10. (It is possible to use the speaker 11 provided to the panel 5, or a speaker provided on the inside of a door.) A front camera 12 is provided to the front end of the vehicle B, and a rear camera 13 is provided to the rear end of the vehicle B. While the monitor 10 is a liquid crystal monitor provided with a backlight, it may also be a plasma display or a CRT display. A pressure-sensitive touch panel or an electrostatic touch panel is used as the touch panel 10T, and the touch panel 10T outputs the touch position of a finger, etc. as location data. The monitor 10 may also be used to display GPS navigation data.

Each of the front camera 12 and the rear camera 13 houses a CCD imaging device and is configured to output captured information as moving image information. The front camera 12 is set so that the ground surface in front of the vehicle B is the main imaging area, and the rear camera 13 is set so that the ground surface behind the vehicle B is the main imaging area. Each camera has sufficient performance to output moving image in real time.

A steering sensor 14 for measuring a steering direction and a steering amount is provided to the operation system of the steering wheel 4, and a shift position sensor 15 for determining a shift position is provided to the operation system of the shift lever 6. An accelerator sensor 16 for measuring the amount of accelerator pedal operation is provided to the operation system of the accelerator pedal 7, and a brake sensor 17 for detecting the operation of the brake pedal is provided to the operation system of the brake pedal 8.

A travel distance sensor 18 for measuring the travel distance of the vehicle B based on the number of rotation of the drive train is provided to the change speed mechanism T. A photo-interrupter or pickup-type sensor for measuring the number of rotation of at least one of the front wheels 1 and the rear wheels 2 may be used as the travel distance sensor 18. A control unit 20 (an example of the assist information output means) as an ECU for performing travel control is disposed in the central part of the vehicle B.

Figure 5:
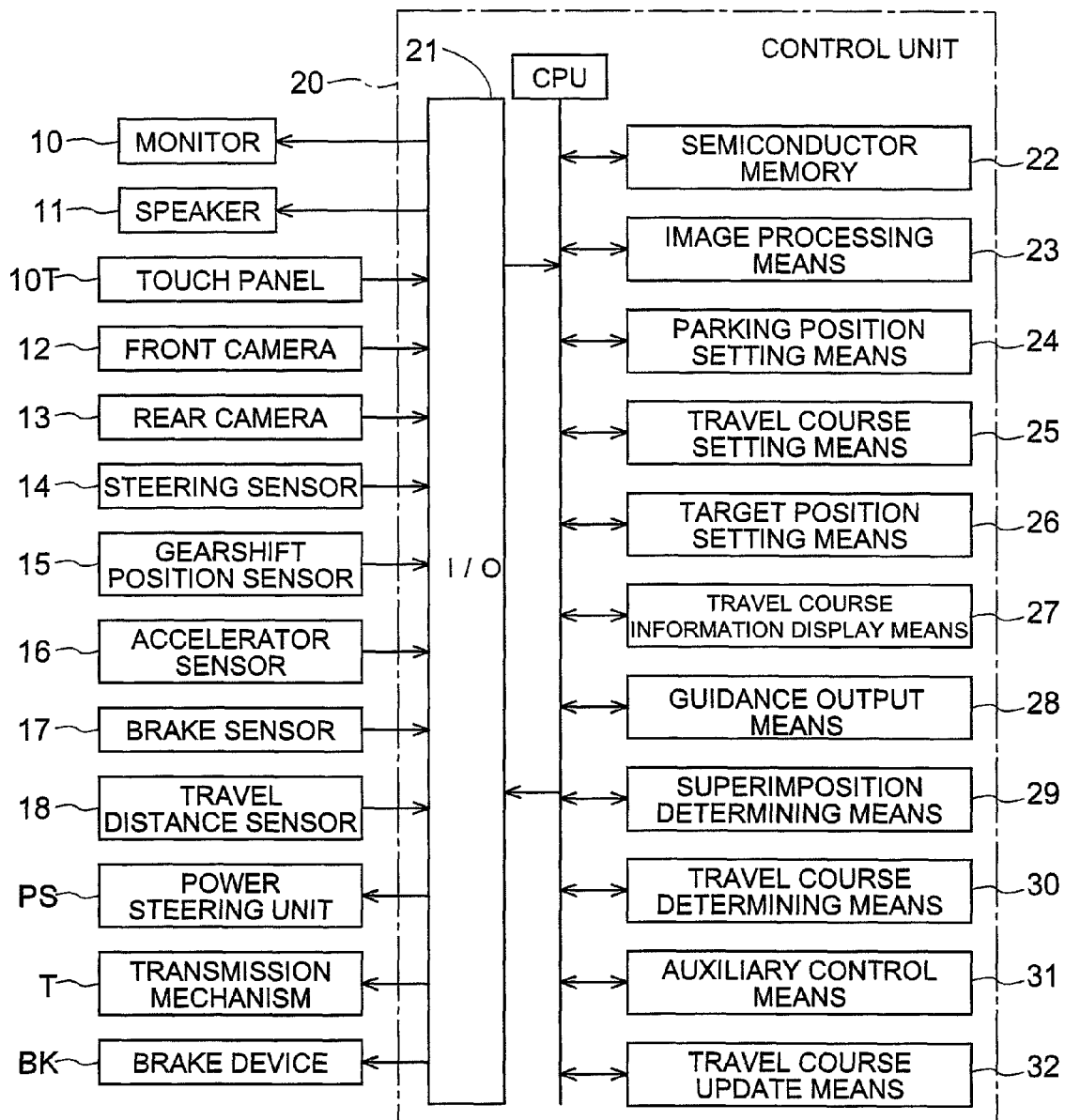
FIG. 5 is a block circuit diagram of the control system.

FIG. 5 shows the system for inputting and outputting information to and from the control unit 20 that functions as the assist information output means of the present invention. The control unit 20 is provided with an input system for receiving information from the touch panel 10T, the front camera 12, the rear camera 13, the steering sensor 14, the shift position sensor 15, the accelerator sensor 16, the brake sensor 17, and the travel distance sensor 18; and an output system for outputting control signals to the monitor 10, the speaker 11, the power steering unit PS, the change speed mechanism T, and the brake device BK.

The control unit 20 is provided with an input/output interface 21 for inputting and outputting information, and a microprocessor CPU for processing information from the input/output interface 21. Semiconductor memory 22, an image processing means 23, a parking position setting means 24, a travel course setting means 25, a target position setting means 26, a travel course information display means 27, a guidance output means 28, a superimposition determining means 29, a travel course determining means 30, an auxiliary control means 31, and a travel course update means 32 are each connected to a data bus of the microprocessor CPU. While the control system requires a control bus, an address bus, etc. besides the data bus in this control system, the drawing does not show the control bus, the address bus, or the interfaces in the interest of simplifying the drawing.

The image processing means 23 processes the image information from the front camera 12 or the rear camera 13 in real time to display the information on the monitor 10, and at the same time synthesizes and displays, on the monitor 10, the parking area 45 (see FIG. 8), bar-shaped (line-shaped) guide information G (a broader concept covering the plurality of guide information described hereinafter; see FIG. 6), an indicator H indicated by a rectangular frame whose size is sufficient to accommodate the bar-shaped guide information G, and other information described hereinafter. The parking position setting means 24 sets a parking position P based on human operation of the touch panel 10T or of vehicle movement. The travel course setting means 25 calculates a travel course C for introducing the vehicle B into the parking position P based on the parking position P and the current position of the vehicle B. The target position setting means 26 sets a plurality of target positions along the travel course C. The travel course information display means 27 displays the guide information G corresponding to the target position, and the indicator H and other information for determining the position of the vehicle B on the monitor 10.

The guidance output means 28 outputs information necessary for moving the vehicle B along the travel course C. The superimposition determining means 29 determines whether the guide information G and the indicator H are in a overlapping positional relationship on the monitor 10. The travel course determining means 30 determines the positional relationship between the vehicle B and the travel course C based on the information from the travel distance sensor 18 and the steering sensor 14. The auxiliary control means 31 performs control for correcting the driving operations of the driver to the correct direction when the vehicle B is introduced into the parking position P. The travel course update means 32 calculates an error value between the travel course C and the vehicle B from the positional relationship between the guide information G and the indicator H when the vehicle is at rest, and performs a routine for recalculating the travel course for introducing the vehicle B in the current stop position into the parking position P when the error exceeds a predetermined value. The parking assist device of the present invention has the processing system shown in FIG. 5.

While the image processing means 23, the parking position setting means 24, the travel course setting means 25, the target position setting means 26, the travel course information display means 27, the guidance output means 28, the superimposition determining means 29, the travel course determining means 30, the auxiliary control means 31, and the travel course update means 32 are envisaged to be implemented by software deployed in the semiconductor memory 22 or other devices, any one or more of these may also be implemented by logic or other hardware, or by a combination of software and hardware.

When parking the vehicle B in the parking position P (see FIGS. 7 and 8), the vehicle B is stopped in the position (a position imaged by the front camera 12) in which the parking position P is displayed on the monitor 10. The driver subsequently specifies a parking position P on the monitor 10, whereby the control unit 20 calculates the positional relationship between the parking position P and the current position of the vehicle B, calculates the optimal travel course C for introducing the vehicle B into the parking position P, and displays the necessary assist information for moving the vehicle B along the travel course C on the monitor 10. The driver moves the vehicle along the travel course C and parks the vehicle in the parking position P simply by moving the vehicle B in accordance with the assist information displayed on the monitor 10, or a voice message from the speaker 11.

When the operations of the driver are incorrect during introduction of the vehicle B into the parking position P, the control unit 20 automatically performs auxiliary control for causing the correct operations to be performed, and when the vehicle B is stopped in an incorrect position during introduction, the control unit 20 performs a routine for recalculating and updating the travel course for introducing the incorrectly positioned vehicle B into the parking position P.

Figure 7:
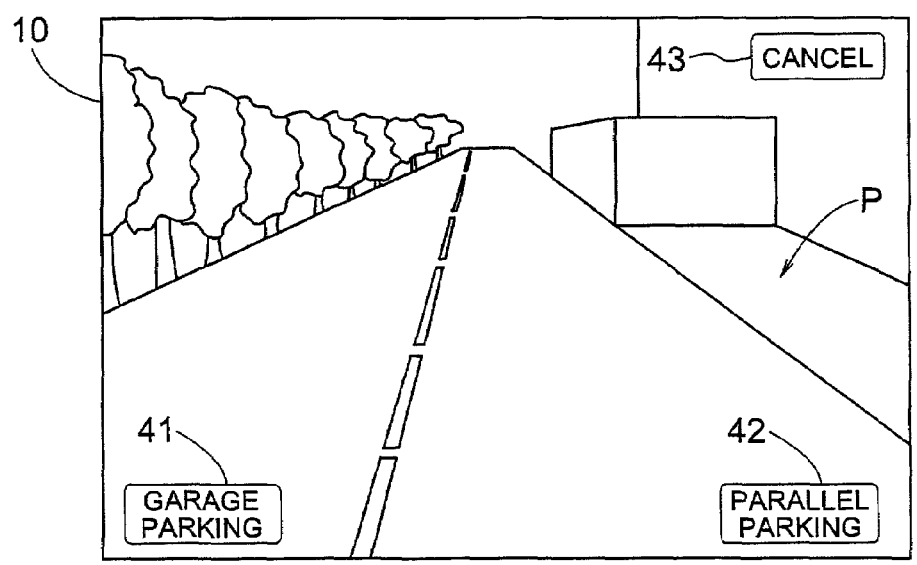
FIG. 7 shows the parking position displayed on the monitor.
Figure 14:
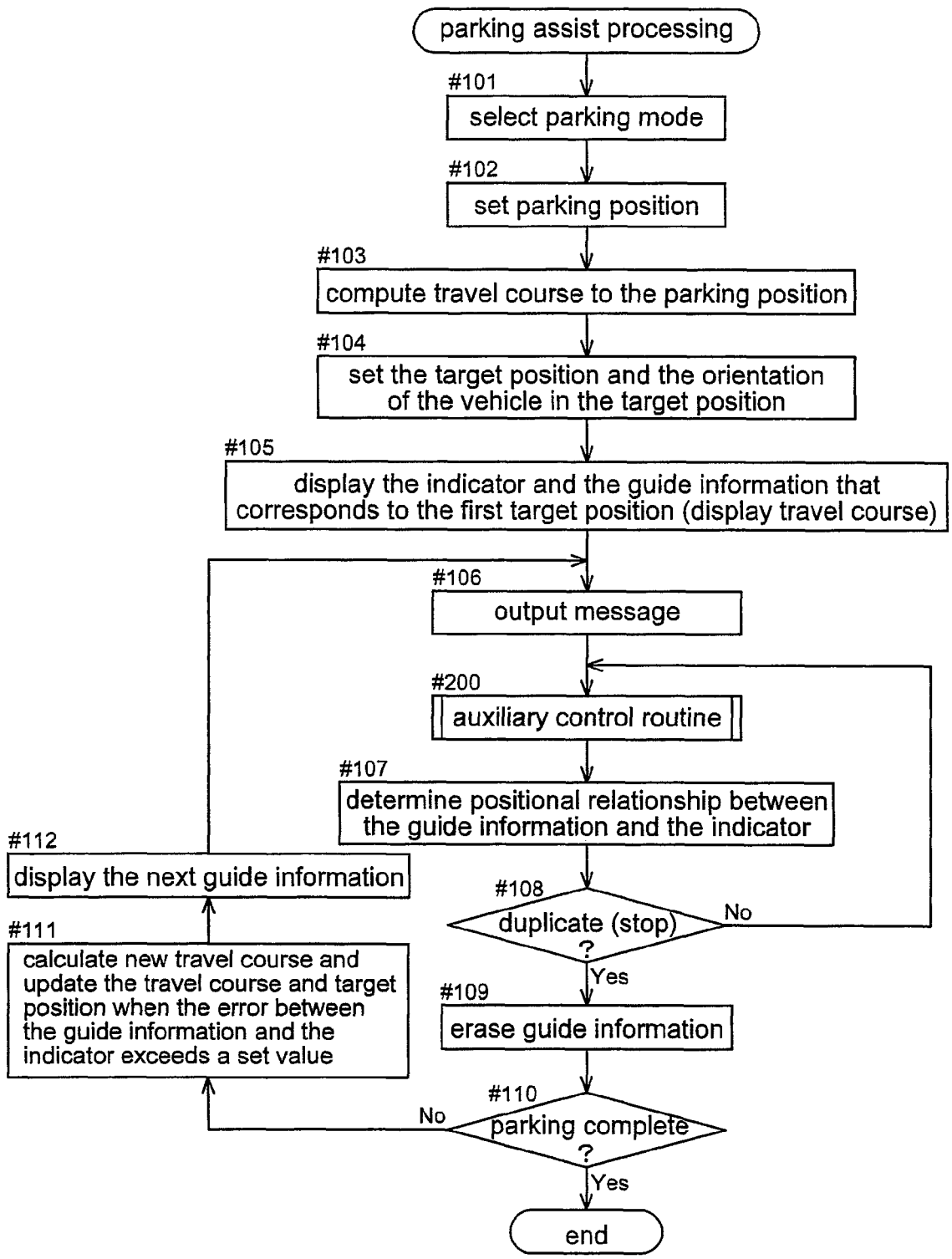
FIG. 14 is a flowchart showing the parking assist routines.
Figure 15:
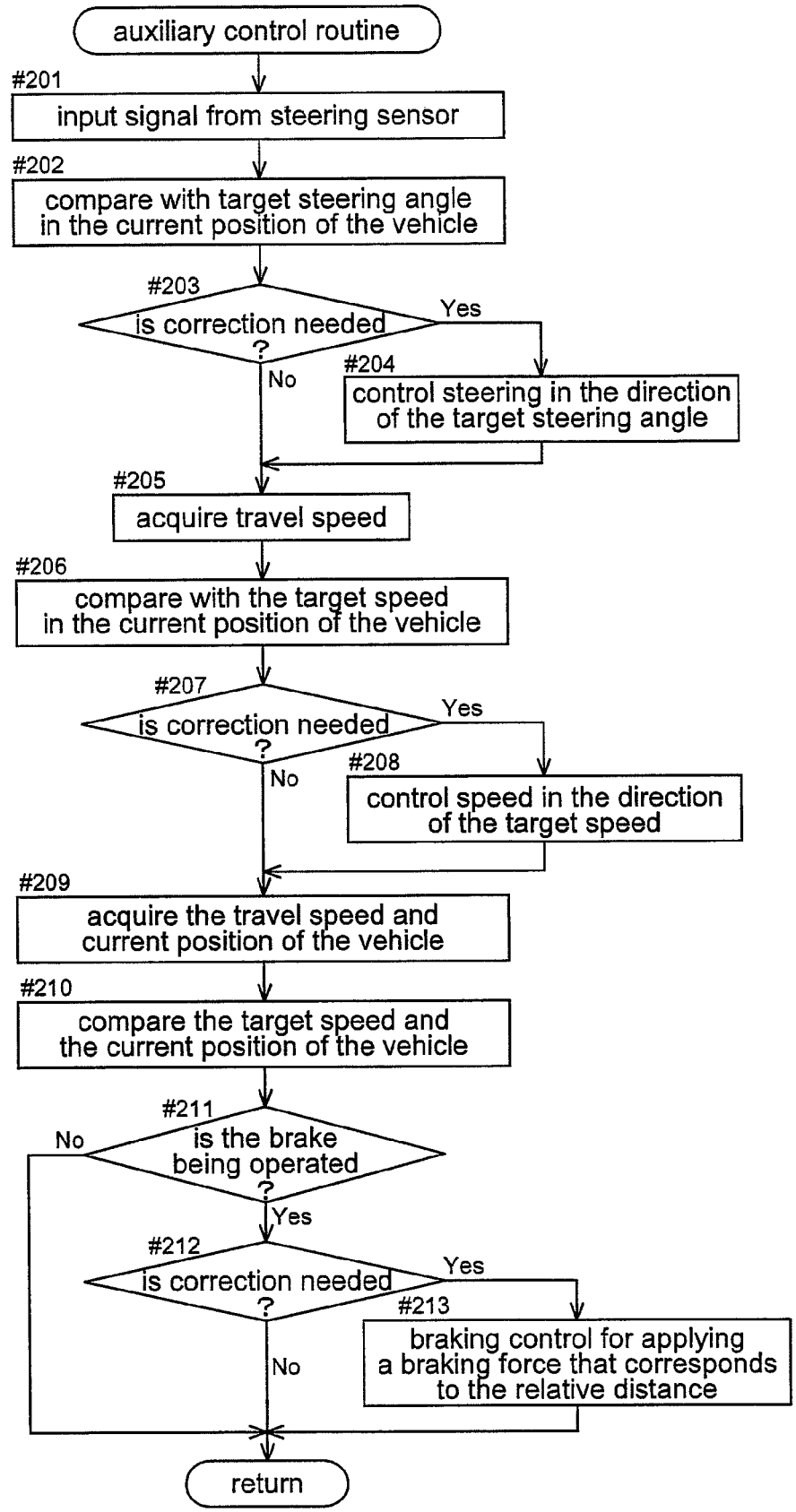
FIG. 15 is a flowchart showing the auxiliary control routines.

An overview of such routines performed by the control unit 20 can be shown by the flowchart shown in FIG. 14. Using garage parking as an example, the vehicle B is stopped in the position in which the parking position P is displayed on the monitor 10, as shown in FIG. 7. In this state, a garage parking button 41, a parallel parking button 42, and a cancel button 43 are displayed on the monitor 10, and the garage parking mode is selected by the driver touching a finger to the garage parking button 41 (step #101). One touches the cancel button 43 to cancel a parking assist.

In the parking assist device of the present invention, the mode for introducing the vehicle B into the parking position P in an orientation parallel to the orientation in which the vehicle B is stopped is referred to as parallel parking, and the mode for introducing the vehicle B into the parking position in an orientation orthogonal to the orientation in which the vehicle B is stopped is referred to as garage parking. When the parallel parking button 42 is actuated, the travel course C for introducing the vehicle B into the parking position P is set, the assist information is displayed on the monitor 10 by the same processing as in the aforementioned garage parking mode, a message is outputted as assist information from the speaker 11, and garage parking can be performed based on the provided information.

Figure 8:
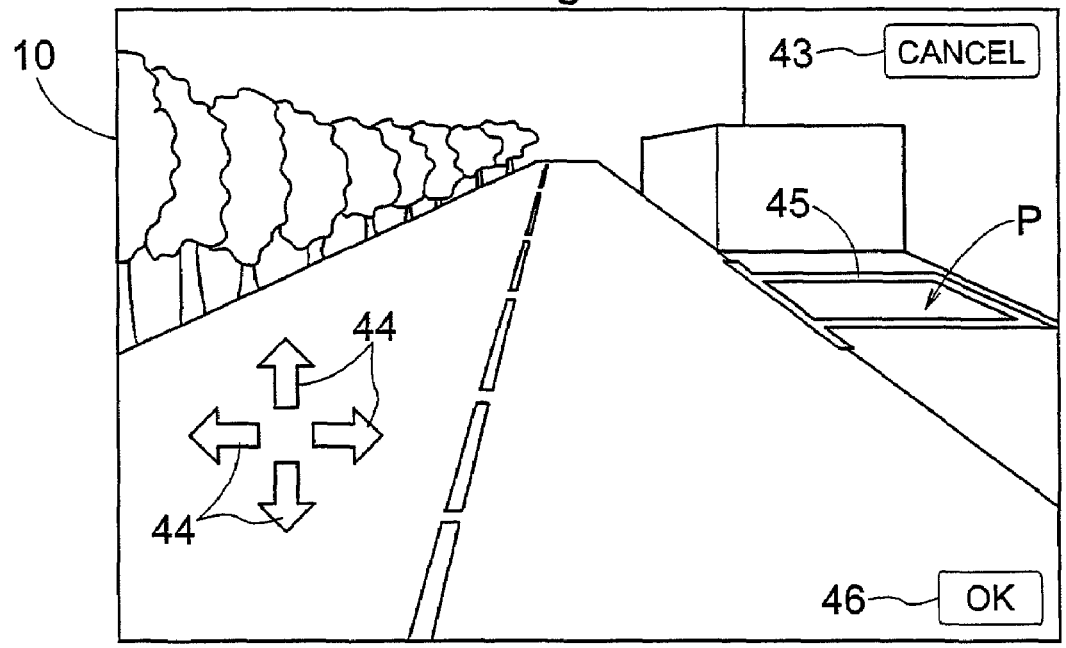
FIG. 8 shows the monitor display when the parking position is set.

As previously mentioned, after the garage parking mode is selected, four cursor buttons 44 and the outline of a parking area 45 for specifying the parking position P are displayed on the monitor 10, as shown in FIG. 8. When the driver touches any of the cursor buttons 44 when the display is in this state, the parking area 45 is moved to the parking position P on the monitor 10, and operating an OK button 46 with the parking area 45 set to the correct position fixes the position of the parking area 45, and the position encompassed by the parking area 45 is set to be the parking position P (step #102). This processing is executed by the parking position setting means 24, and the size of the parking area 45 is set based on the total length and width of the vehicle B. The cursor buttons 44 and the parking area 45 are displayed on the monitor 10 by the image processing means 23.

Since a wide-angle lens is used as the imaging lens (not shown) of the front camera 12, the perspective is exaggerated, and linear objects appear curved. The imaging lens used in the front camera 12 is a fixed-focus lens, and the imaging direction is fixed to the vehicle B. And since the level of the imaged ground surface coincides with the ground contact level of the front wheels 1 and rear wheels 2, the relative distance between a particular position on the ground surface displayed on the monitor and the vehicle B can be obtained by processing the image. Thus, by providing the image processing means 23 with table data, parameters, or the like for acquiring the distance of the vehicle B from a position displayed on the monitor 10, the shape of the display is changed to be consistent with the perspective created by the imaging lens when the parking area 45 is moved as previously described, the position of the parking position P (parking area 45) in relation to the vehicle B can be identified, and the positional relationship or distance between the parking position P and the vehicle B can be acquired with relatively high precision. A camera having the same capabilities as the front camera 12 is also used as the rear camera 13.

The parking area 45 may be aligned with the parking position not only by selecting settings with a cursor, but also by moving the vehicle B.

Figure 6:
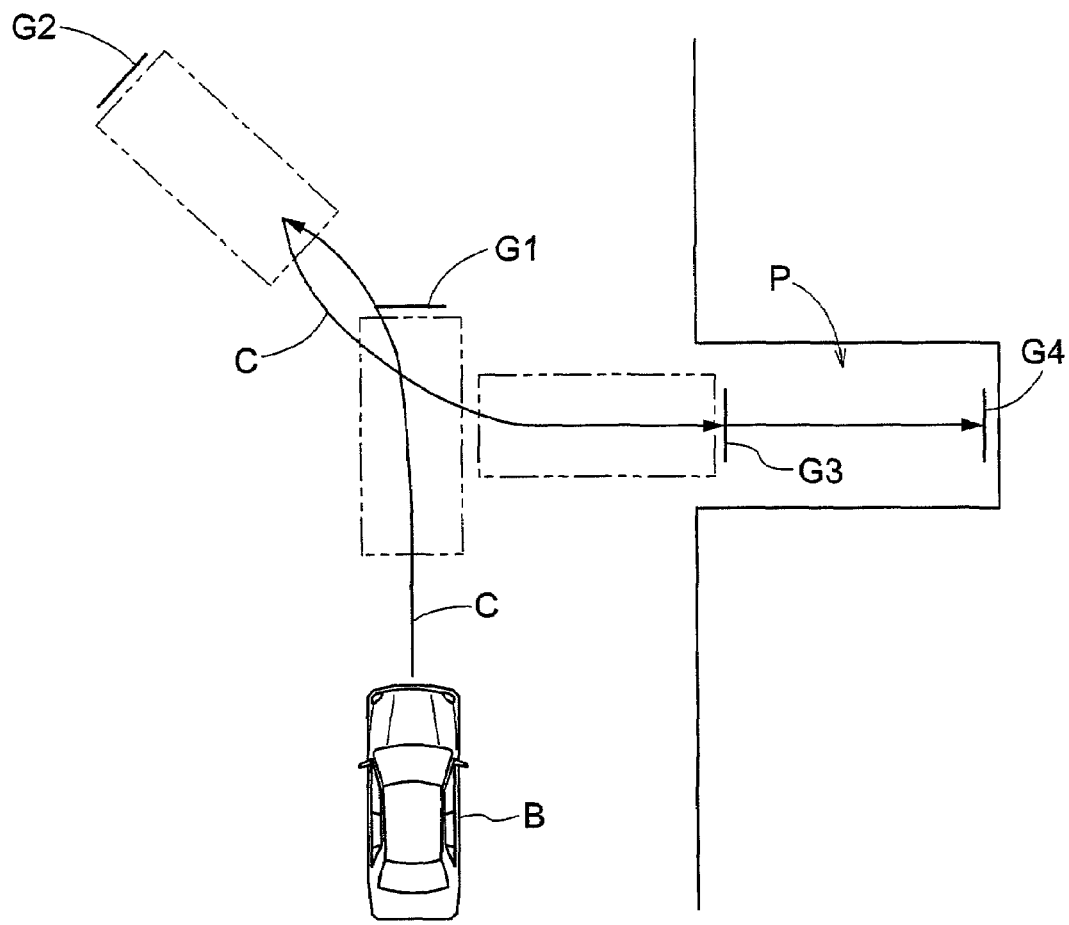
FIG. 6 is a diagram showing the positions of the guide information and the travel course for introducing the vehicle into the parking position.

After the relative distance between the parking position P and the current stop position of the vehicle B is acquired, the travel course C shown in FIG. 6 for introducing the vehicle B into the parking position P is computed based on the acquired information (step #103), the target positions are set on the travel course C, and the orientation of the vehicle B in each target position is computed (step #104). These routines are executed by the travel course setting means 25, and the travel course setting means 25 computes the optimum travel course C for introducing the vehicle B into the parking position P from the positional relationship or distance between the parking position P and the current position of the vehicle B based on the total length and width, wheelbase, turning characteristics, and other data of the vehicle B. The travel course C is the path in which the center of the rear wheel axle moves.

The travel course C thus computed and as seen from above has the shape shown in FIG. 6. Four target positions are set on the travel course C, and guide information G1 through G4 is set for the four target positions. Among the guide information G, the first and second guide information G1, G2 is displayed on the ground surface imaged by the front camera 12 during a forward movement of the vehicle B, and the third and fourth guide information G3, G4 is displayed on the ground surface imaged by the rear camera 13.

The guide information G1 through G4 is in the form of lines, and the longitudinal direction of the lines of guide information G1 through G4 coincides with the width (left-right) direction of the vehicle B. The vehicle B is placed in the correct orientation in the correct stop position by stopping the vehicle B such that the guide information is superimposed on the indicator H displayed on the monitor 10 to match G1 and G2, of the guide information G1-G4, with the front end of the vehicle B on the monitor 10, and to match G3 and G4 with the rear end of the vehicle B on the monitor 10.

Figure 9:
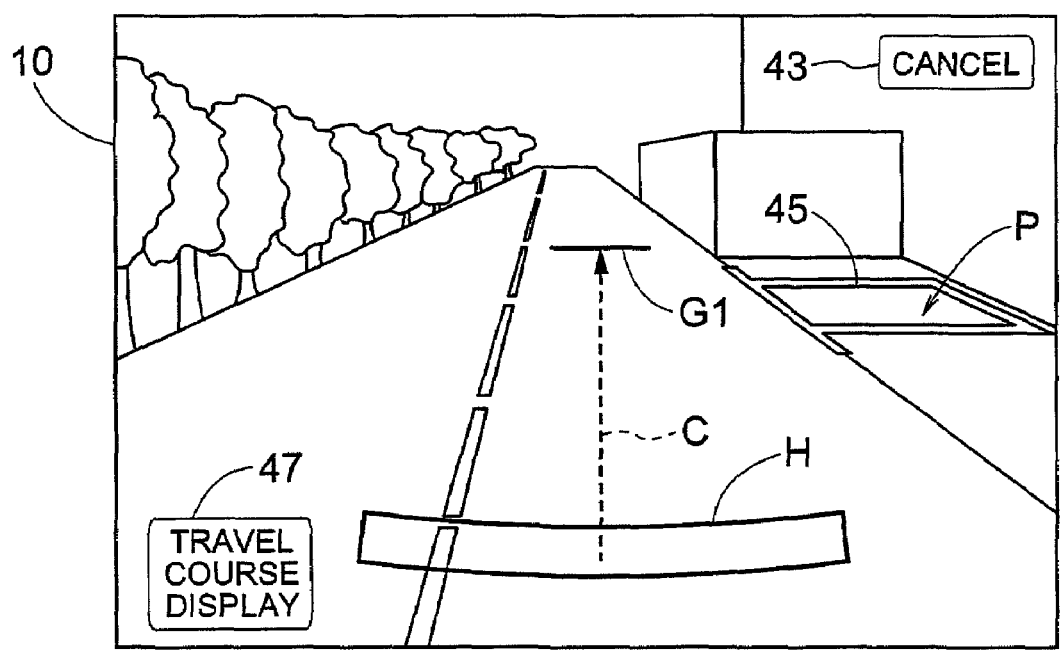
FIG. 9 shows the initial guide information displayed on the monitor.

When these routines are completed, the initial (first) guide information G1 corresponding to the target position is displayed in red on the ground surface on the monitor 10, as shown in FIG. 9 (step #105) and the yellow frame-shaped indicator H elongated in the width direction of the vehicle B so as to encompass the guide information G1 is displayed at the lower end of the monitor 10 (the side nearest the vehicle B) at the same time. This process is implemented by the image processing means 23 synthesizing the guide information G generated by the target position setting means 26 with the image from the front camera 12. The aforementioned colors are not limiting insofar as the guide information G1 and the indicator H are each displayed in different colors.

As described previously, when the guide information G is displayed on the ground surface on the monitor 10, and the vehicle B is moved in the direction approaching the guide information G, the guide information G on the ground surface displayed on the monitor 10 must be displayed to be moving toward the vehicle B along with the ground surface, and this processing is performed by the image processing means 23.

A travel course display button 47 is displayed on the monitor 10. When the driver operates the travel course display button 47, the travel course C shown in the diagram is displayed on the ground surface in red (the travel course C is not displayed when the travel course display button 47 is not operated). In this routine, a voice message saying "please move until the red line display enters the yellow frame" is outputted from the speaker 11 (step #106). While these routines are executed by the guidance output means 28, an output may also be configured such that the message is displayed on the monitor 10 at the same time the voice message is output.

By moving the vehicle in accordance with the message, the movement direction is determined by the information from the shift position sensor 15, the steering amount is acquired by the steering sensor 14, and the traveling distance of the vehicle B is acquired by the travel distance sensor 18. Based on the information thus acquired, the travel course determining means 30 determines whether the vehicle B is moving along the travel course C. As a result of this determination, the auxiliary control means 31 controls at least one of the change speed mechanism T, the power steering unit PS, and the brake device BK to perform auxiliary control so that the vehicle B travels to a position closer to the correct travel course C (step #200).

Step #200 is set as an auxiliary control routine (sub-routine). In this auxiliary control routine, a signal from the steering sensor 14 is compared with a target steering angle in the current position of the vehicle B, and when the steering angle is smaller or larger than a reference angle region (dead zone) set about a target steering angle, the control unit 20 performs correction control for operating the power steering unit PS in the direction of the target steering angle, whereby the vehicle is steered to approximate the correct steering angle. Correction control is not performed when the steering angle is within the reference region that is set based on the target steering angle (steps #201 through #204).

The travel speed of the vehicle B is acquired and compared with a target speed in the current position of the vehicle B, and when the travel speed of the vehicle B is higher or lower than a reference speed region (dead zone) that is set about a target speed in the current position of the vehicle B, the control unit 20 controls the change speed mechanism T and performs correction control for changing speed toward the target speed, whereby the correct travel speed is obtained. Correction control is not performed when the travel speed of the vehicle B is within the reference speed region for the current position of the vehicle B (steps #205 through #208).

Figure 16:
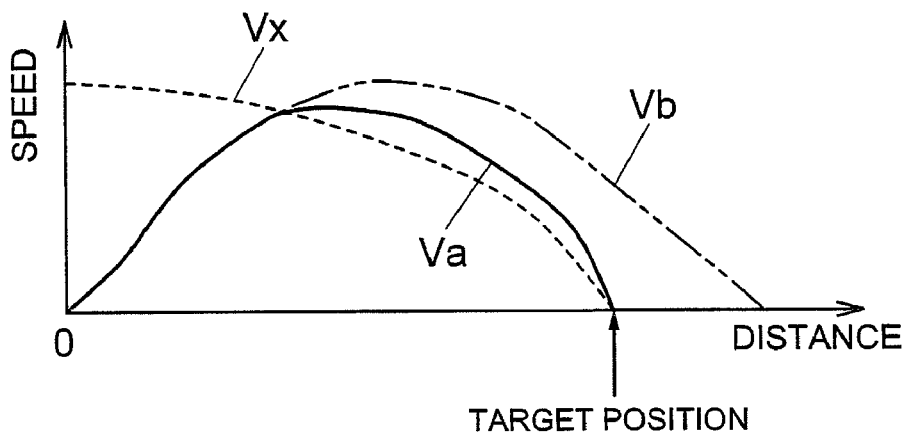
FIG. 16 is a diagram showing the target speed and the change in speed due to speed change at the time of correction control.

The change in speed when this speed control is performed can be shown as indicated by the graph in FIG. 16. That is, a target speed Vx is set so that the speed is reduced smoothly as the vehicle approaches the target position (guide information G), so that even in a case in which speed Vb is reached without correction control, performing control that follows the target speed Vx allows the speed to be reduced as the vehicle approaches the target position, and the speed to be brought to zero at the target position, as indicated by the speed Va. Specifically, a control configuration is set so as to stop the vehicle at the target position, and when the speed is controlled in this manner, the travel speed of the vehicle B is maintained at the target speed through brake control. It is also possible to maintain the travel speed of the vehicle B at the target speed by giving priority to control of at least one of the change speed mechanism T and the speed of the engine E over operation of the accelerator pedal 7.

Figure 17:
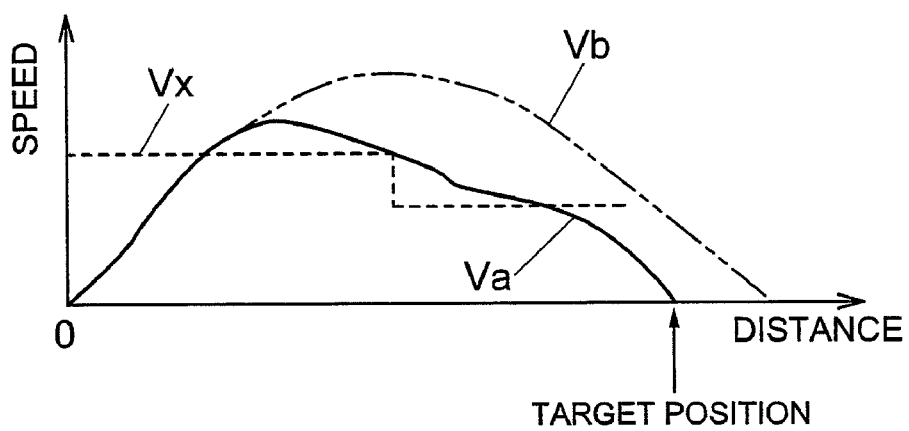
FIG. 17 is a diagram showing the target speed and the change in speed due to a speed change at the time of correction control.

The control shown in the graph of FIG. 17 may also be used in lieu of the speed control described above. In the control shown in FIG. 17, a target speed Vx is set so that the speed is incrementally reduced as the vehicle approaches the target position (guide information G). Even in a case in which speed Vb is reached without the correction control, performing control that follows the target speed Vx allows the speed to be reduced as the vehicle approaches the target position, as indicated by the speed Va. A control configuration is thus possible where the vehicle is stopped in the target position.

The travel speed and the current position of the vehicle B are then acquired, and the travel speed and the current position of the vehicle B are compared, and a determination is made based on the signal from the brake sensor 17 as to whether the brake pedal 8 is being operated. When the speed is higher than a reference speed region (dead zone) that is set based on the relative positions of the vehicle B and the target position, the control unit 20 performs correction control for braking of the brake device BK, whereby the correct travel speed is obtained by applying a braking force based on the relative position of the vehicle B and the target position. Correction control is not performed when the speed is lower than the speed that is set based on the relative positions of the vehicle B and the target position (steps #209 through #213).

Figure 18:
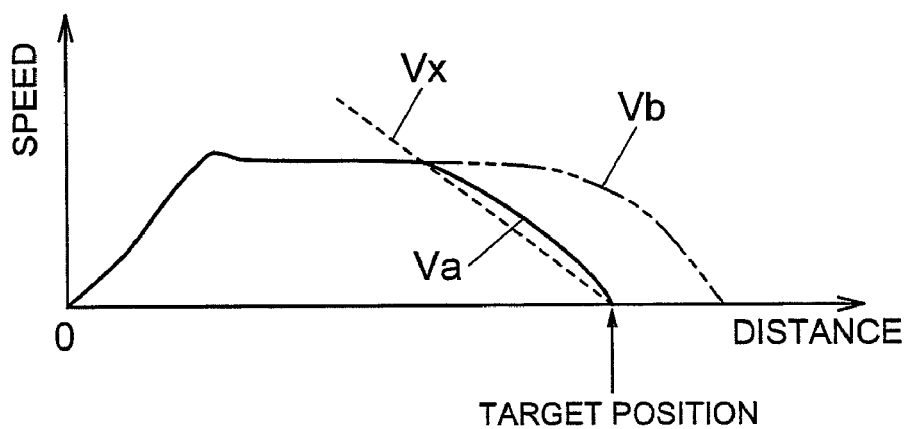
FIG. 18 is the target speed and the change in speed due to braking at the time of correction control.

The speed change that occurs when this braking control is performed can be shown by the graph in FIG. 18. That is, the target speed Vx is set so that the speed decreases as the vehicle approaches the target position (guide information G). When the driver is operating the brake pedal 8, and the speed exceeds the target speed Vx, then the speed can be brought to zero at the target position by applying appropriate braking force even when the speed becomes Vb when correction control is not performed. A control configuration is thus possible where the vehicle is stopped in the target position.

When correction control is performed in this manner, a voice message may be outputted to induce the correct operations, or a message may be displayed on the monitor 10. While a process configuration is described in which an auxiliary control routine (step #200) is executed when the vehicle B is moved to the first guide information G1, this auxiliary control routine is always executed when the vehicle B is moved so as to be introduced into the parking position P.

Figure 10:
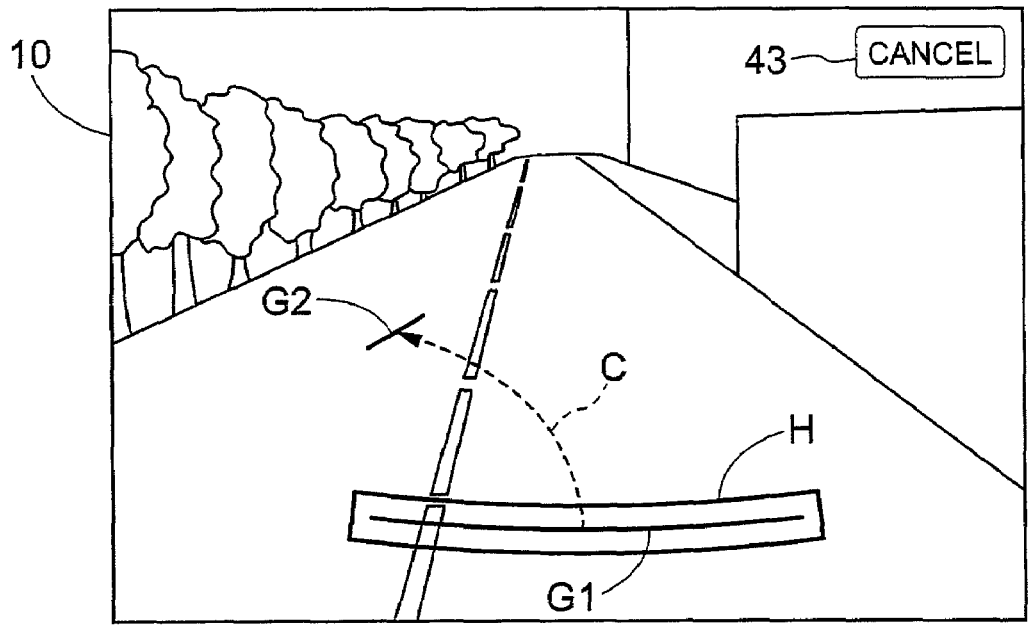
FIG. 10 shows the monitor in which the indicator and the initial guide information are superimposed on the display.

The vehicle B is then moved forward, and stopped in the position (overlap position) in which the first guide information G1 is surrounded by the indicator H as shown in FIG. 10, whereby the guide information G1 surrounded by the indicator H changes from red to green. The guide information G1 is then erased from the monitor 10, the next (second) guide information G2 is newly displayed on the monitor 10, and a voice message saying "please turn the wheel all the way to the left and drive until the red line display enters the yellow frame" is outputted from the speaker 11 (this message may also be displayed on the monitor 10) (steps #107 through #112). When the vehicle B is stopped, the error is calculated from the positional relationship between the guide information G1 and the indicator H, and when the error exceeds a predetermined value, the travel course is recalculated, and the target position is then updated so as to reduce the effect of the error on the target parking position (step #111).

As previously mentioned, determining whether the guide information G and the indicator H are superimposed on each other entails continually computing the relative positions from the travel direction and such values as the travel distance of the vehicle B, and drawing and erasing the guide information G1 on the image of the front camera 12 according to the calculation results. The guidance output means 28 erases the guide information G1 and newly displays the guide information G2. While FIG. 10 shows the travel course C being displayed while the guide information G1 and the indicator H coincide on the monitor 10, these are not displayed at the same time. The display sequence may be that the guide information G1 and the indicator H coincide, after which the guide information G1 is erased, and the travel course C is then displayed immediately after the guide information G1 is erased. This display sequence is the same in FIGS. 11 and 13 described hereinafter.

The process based on the aforementioned steps #107 through #112 is continued until the vehicle B is moved to the position in which the final (fourth) guide information G4 is surrounded by the indicator H. The content displayed on the monitor 10 during this continuous process is shown in FIGS. 10 through 13, and the form of this process is described hereinafter.

Figure 11:
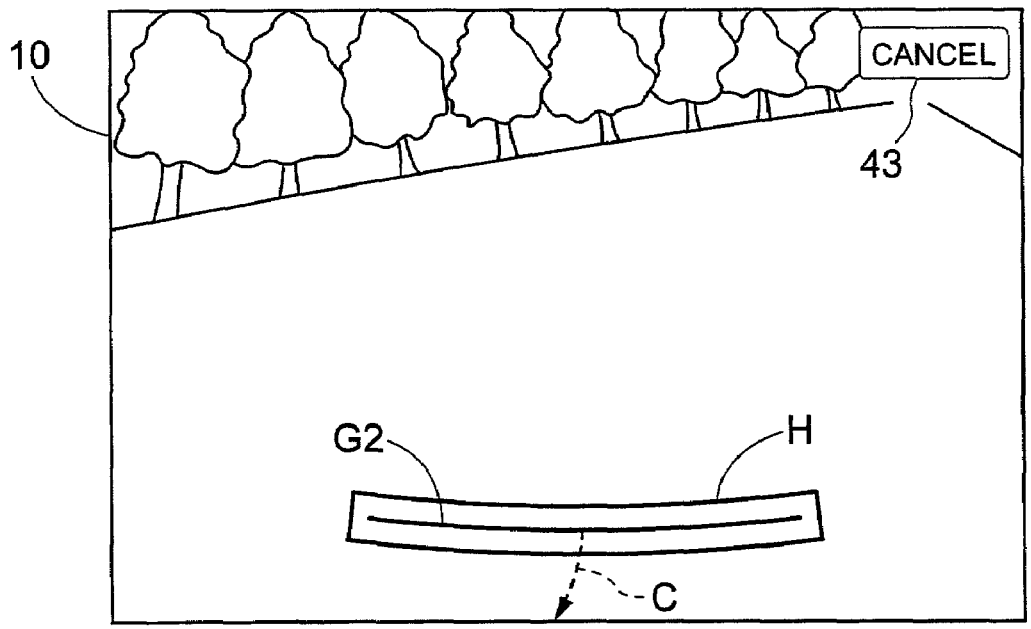
FIG. 11 shows the monitor in which the indicator and the second guide information are superimposed on the display.

That is, when, after the second guide information G2 is displayed, the vehicle B is moved to and stopped in the position (superimpose position) in which the second guide information G2 is surrounded by the indicator H, the guide information G2 surrounded by the indicator H, as shown in FIG. 11, is changed from red to green and then erased from the monitor 10, and the message "please set the shift lever to the reverse position" is outputted from the speaker 11 as shown in FIG. 11 (the message may also be simultaneously displayed on the monitor 10).

Figure 12:
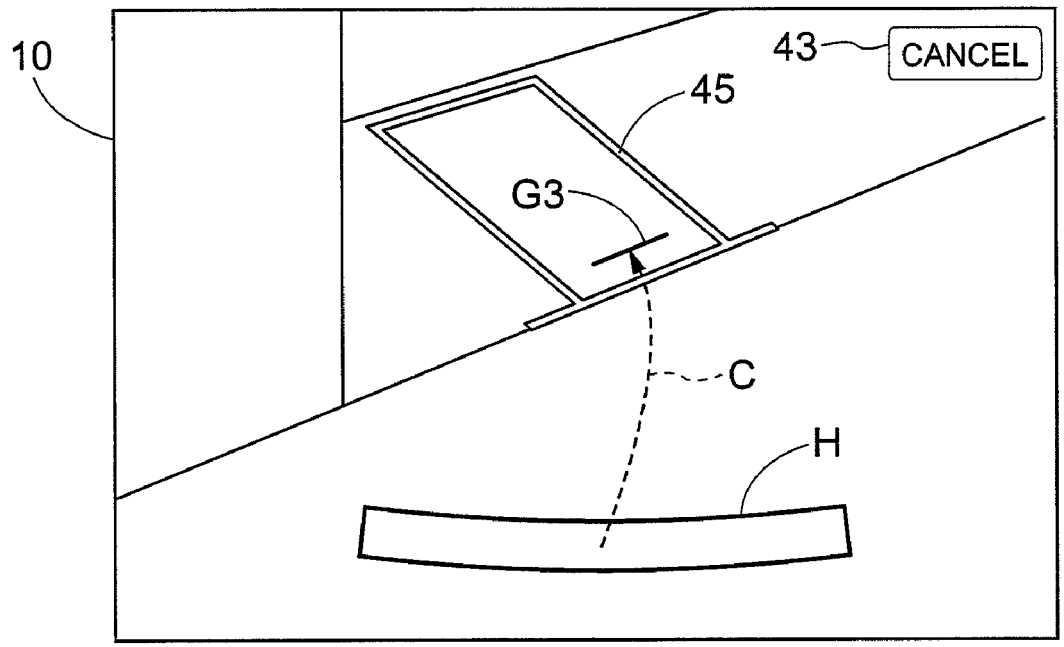
FIG. 12 shows the monitor in which the third guide information is displayed.

The shift lever 6 is set in the reverse position, whereby an image from the rear camera 13 is displayed on the monitor 10 as shown in FIG. 12, the next (third) guide information G3 f is displayed on the monitor 10, and the message "please turn the wheel all the way to the right and drive until the red line display enters the yellow frame" is outputted from the speaker 11 (the message may also be simultaneously displayed on the monitor 10).

Figure 13:
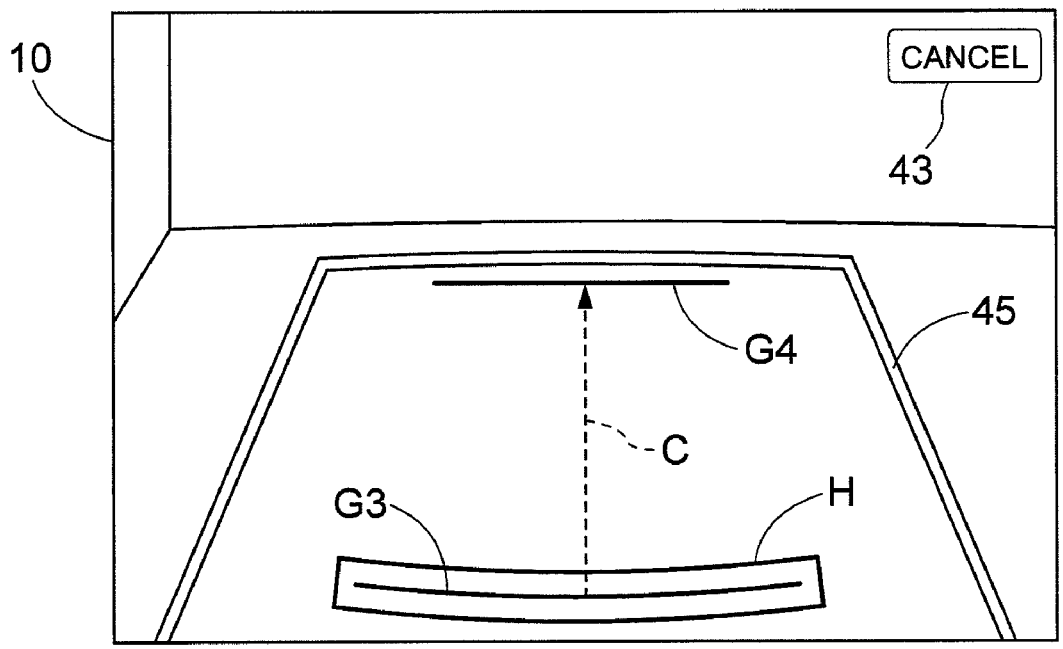
FIG. 13 shows the monitor in which the indicator and the third guide information are superimposed on the display.

By moving the vehicle B while the steering wheel 4 is turned according to the message, the position (superimpose position) is reached in which next guide information G3 displayed on the monitor 10 is surrounded by the indicator H as shown in FIG. 13, at which time the vehicle B is stopped. When the vehicle B is stopped in such a state, the message "please return the wheel to the neutral position and drive until the red line display enters the yellow frame" is outputted from the speaker 11 (the message may also be simultaneously displayed on the monitor 10).

By driving vehicle B in reverse while turning the steering wheel 4 in accordance with the message, the position (super-impose position (not shown)) is reached in which the final (fourth) guide information G4 displayed on the monitor 10 is surrounded by the indicator H. When the final guide information G4 and the indicator H are superimposed in this manner, the message "parking complete" is outputted from the speaker 11 (the message may also be simultaneously displayed on the monitor 10), and parking is completed. When parking is completed in this manner, the vehicle B is situated within the parking area 45 displayed on the monitor 10.

The vehicle B is sometimes stopped in an inappropriate position by an inappropriate operation performed by the driver while the vehicle B is being introduced into the parking position P in the manner described above. When the vehicle B is stopped in an inappropriate position in this manner, the travel course update means 32 executes the routine shown in step #111, whereby the travel course C is recalculated, and a new target position is set for the travel course C.

Figure 19:
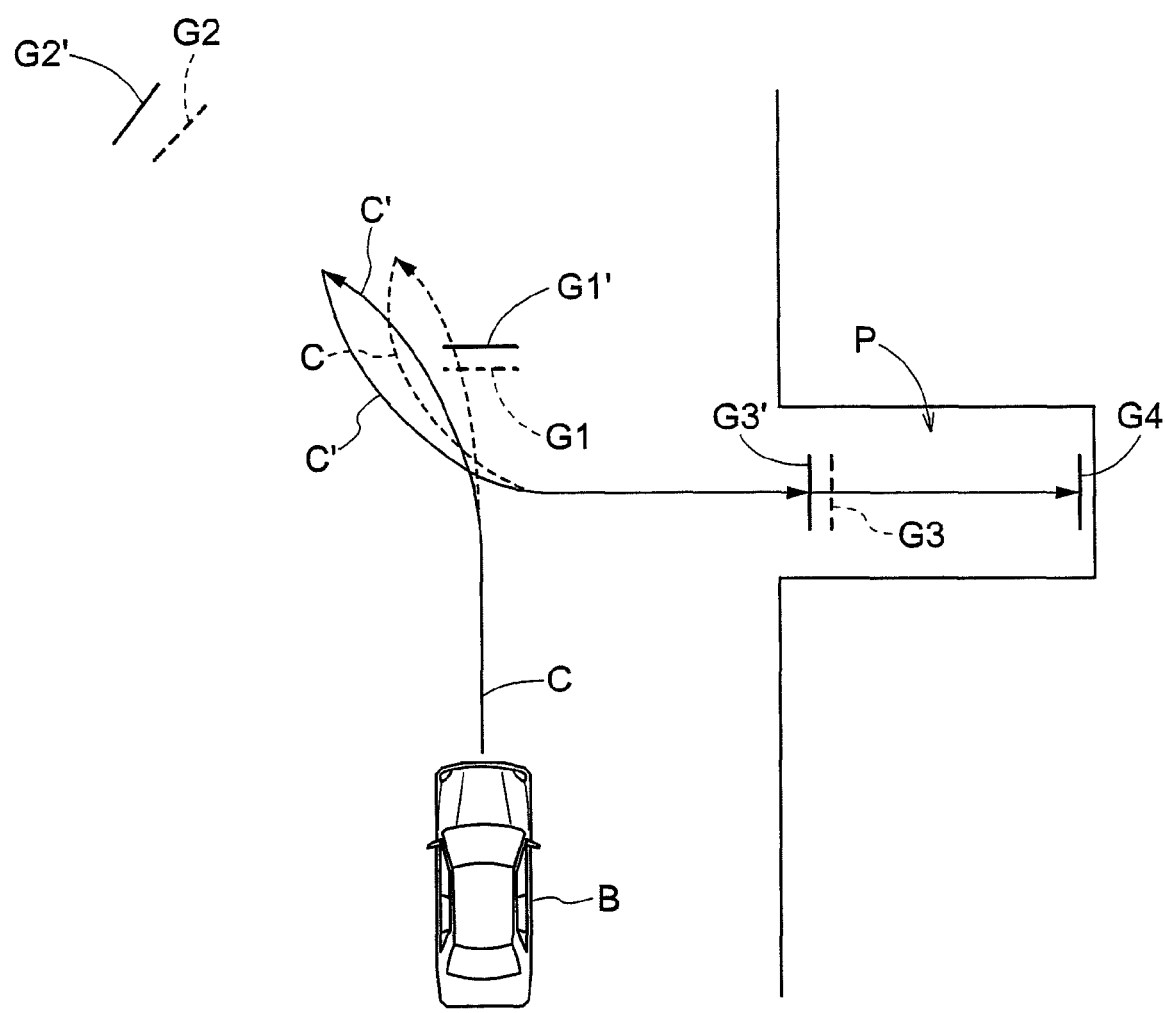
FIG. 19 is a diagram showing the initial travel course and the newly set travel course.

As a specific example, when operation of the brake pedal 8 is delayed, the vehicle B may stop in a position that is slightly past the position of the first guide information G1, as shown in FIG. 19. In such a case, a new travel course C' is calculated in place of the correct travel course C by using image processing to assess the positioning error between the guide information G and the indicator H and to assess the error in the orientation of the vehicle B, a new target position is set with respect to the travel course C', and guide positions G2', G3' are set in accordance with the target position. A message is also presented as needed for the new guide positions G2', G3'. Consequently, even when the vehicle B is stopped in an incorrect position during introduction of the vehicle B into the parking position, the vehicle B can be introduced into the parking position P simply by operating according to the information displayed on the monitor 10 and the messages outputted from the speaker 11.

According to the present invention thus configured, the driver specifies the parking position P on the monitor 10 in which an image captured by the front camera 12 is displayed, and after a parking mode is selected, the travel course C for introducing the vehicle B into the parking position P is automatically calculated, and a plurality of target positions on the travel course C and the orientation of the vehicle B in the target positions are established. While a plurality of target positions may be set when the vehicle B is introduced into the parking position P, since only the guide information G alone, presented in the form of a line, are displayed on the ground surface on the monitor 10 in correspondence with the target positions for movement of the vehicle and, at the same time, the frame-shaped indicator H is displayed on the monitor 10, and messages necessary for movement of the vehicle B are outputted as a voice or text information, a simple moving operation is possible where the driver moves the vehicle B by following the messages until it reaches the position (superimpose position) where the guide information G in the form of a line is surrounded by a frame-shaped indicator H.

Since the guide information G is newly displayed on the monitor 10 simply by moving the vehicle B to the position (superimposing position) in which the line guide information G is surrounded by the indicator H, the vehicle B can be moved along the correct travel course C and introduced into the parking position P while the inconvenience of recognizing a wrong target is prevented. In particular, the inconvenience of having the vehicle B significantly deviating from the travel course C can be prevented through correction control during introduction of the vehicle B into the parking position P even when the steering, acceleration, and braking are somewhat inappropriate. Even when the vehicle B deviates from the travel course C, the vehicle B can be correctly introduced into the parking position P by calculating a new travel course C' when the vehicle B is stopped and by displaying guide information on the monitor 10 that is in accordance with the travel course C' thus calculated.

INDUSTRIAL APPLICABILITY

The parking assist device is capable of providing parking assist regardless of the vehicle size. For example, parking can be performed by a smooth operation when the present invention is used in an automobile such as a large truck, which has a structure in which the area behind the vehicle is difficult to confirm. In addition to the monitor provided near the driver seat, an auxiliary monitor may be provided behind the driver seat to enable information to be confirmed when the vehicle is moving in reverse, for example, and even more precise parking assist can be provided by displaying the same information in the auxiliary monitor as in the main monitor.

The invention claimed is:

1. A parking assist device comprising:
   a monitor for displaying captured images from a camera provided to a vehicle body; and
   assist information output means for displaying assist information for assisting parking on said monitor;
   wherein said camera captures a forward image, and said assist information output means performs routines for calculating a travel course for introducing the vehicle into a predetermined parking position, setting a target position on the travel course, displaying guide information corresponding to the target position over a ground surface displayed on said monitor during forward travel, and displaying an indicator corresponding to a current position of said vehicle on said monitor; and
   an auxiliary control means is provided for assisting a driving operation of a driver so as to guide said indicator to a position of said guide information when said vehicle is moved to a stopping position,
   wherein said assist information output means includes travel course update means for calculating a positional error between said travel course and the vehicle based on a positional relationship between said guide information and the indicator, or a positional relationship between said target position and the vehicle, and newly calculating a travel course for introducing the vehicle from a current position to said parking position based on the positional error.

2. The parking assist device according to claim 1, further comprising:
   a steering unit for steering a steered wheel of the vehicle based on operation of a steering wheel; and a steering sensor for measuring a steering angle of said steered wheel; wherein said auxiliary control means controls said steering unit and corrects the steering angle of said steered wheel to a correct direction when a steering angle from the steering sensor differs from a target value that is set based on said travel course.

3. The parking assist device according to claim 1, further comprising:
   a brake unit for applying a braking force to a wheel of said vehicle based on a brake pedal operation; and a brake sensor for detecting operation of said brake pedal; wherein said auxiliary control means performs braking control of said brake unit when said vehicle approaches a stopping position set in said travel course while said brake sensor detects that the brake pedal is being operated.

4. The parking assist device according to claim 1, further comprising:
   a speed setting unit for setting a travel speed of the vehicle based on operation of an accelerator operation member; and an accelerator sensor for measuring an amount of operation of said accelerator operation member; wherein said auxiliary control means controls said speed setting unit to reduce a travel speed of the vehicle to a value less than a travel speed set by said accelerator operation member when said vehicle approaches a stopping position set in said travel course.

5. The parking assist device according to claim 1, wherein said guide information is displayed on said monitor in a bar form, and said indicator is displayed on said monitor as a rectangular frame in which said guide information is accommodated.

6. The parking assist device according to claim 1, wherein said assist information output means sets a plurality of target positions located at intermediate positions within said travel course.

7. The parking assist device according to claim 1, wherein said assist information output means sets four target positions on said travel course and sets guide information for the four target positions when providing assistance during garage parking in which the vehicle is introduced into a parking position in an orientation orthogonal to the stopping orientation.

8. The parking assist device according to claim 7, wherein said camera comprises a front camera provided to a front end of said vehicle, and a rear camera provided to a rear end of said vehicle; guide information that is set for a first and second of said four target positions is displayed on a ground surface image captured by said front camera during forward travel of said vehicle; and guide information that is set for a third and fourth of said four target positions is displayed on a ground surface image captured by said rear camera during reverse travel of said vehicle.

9. The parking assist device according to claim 5, wherein said guide information and said indicator are displayed in different colors on said monitor.

* * * * *

UNITED STATES PATENT AND TRADEMARK OFFICE
CERTIFICATE OF CORRECTION

| | | |
|---|---|---|
| PATENT NO. | : 7,825,828 B2 | Page 1 of 1 |
| APPLICATION NO. | : 12/093792 | |
| DATED | : November 2, 2010 | |
| INVENTOR(S) | : Kazuya Watanabe, Kosuke Sato and Hiroshi Yamauchi | |

It is certified that error appears in the above-identified patent and that said Letters Patent is hereby corrected as shown below:

Col. 7, Lines 52 – 65 should read:

In the parking assist device of the present invention, the mode for introducing the vehicle B into the parking position P in an orientation parallel to the orientation in which the vehicle B is stopped is referred to as parallel parking, and the mode for introducing the vehicle B into the parking position in an orientation orthogonal to the orientation in which the vehicle B is stopped is referred to as garage parking. When the parallel parking button 42 is actuated, the travel course C for introducing the vehicle B into the parking position P is set, the assist information is displayed on the monitor 10 by the same processing as in the aforementioned garage parking mode, a message is outputted as assist information from the speaker 11, and ~~garage~~ parallel parking can be performed based on the provided information.

Signed and Sealed this
Twenty-eighth Day of December, 2010

David J. Kappos
*Director of the United States Patent and Trademark Office*